United States Patent
Wakabayashi et al.

(10) Patent No.: US 10,256,667 B2
(45) Date of Patent: Apr. 9, 2019

(54) POWER SUPPLYING DEVICE

(71) Applicant: FUNAI ELECTRIC CO., LTD., Osaka (JP)

(72) Inventors: Naoyuki Wakabayashi, Osaka (JP); Hideki Tanabe, Hirakata (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 107 days.

(21) Appl. No.: 15/291,049

(22) Filed: Oct. 11, 2016

(65) Prior Publication Data
US 2017/0104371 A1   Apr. 13, 2017

(30) Foreign Application Priority Data
Oct. 13, 2015   (JP) .................. 2015-201835

(51) Int. Cl.
| | | |
|---|---|---|
| H02J 50/12 | (2016.01) | |
| H02J 50/10 | (2016.01) | |
| H02J 50/70 | (2016.01) | |
| H01F 38/14 | (2006.01) | |
| H04B 5/00 | (2006.01) | |

(52) U.S. Cl.
CPC .............. *H02J 50/12* (2016.02); *H01F 38/14* (2013.01); *H02J 50/10* (2016.02); *H02J 50/70* (2016.02); *H04B 5/0037* (2013.01); *H04B 5/0081* (2013.01)

(58) Field of Classification Search
CPC . H01F 38/14; H02J 50/10; H02J 50/12; H02J 50/70; H02J 50/90; H04B 5/0037; H04B 5/0081
See application file for complete search history.

(56) References Cited

U.S. PATENT DOCUMENTS

| | | | | |
|---|---|---|---|---|
| 8,772,975 B2* | 7/2014 | Mayo | ............... | H03F 3/2176 307/104 |
| 2003/0137383 A1* | 7/2003 | Yang | ............... | H01F 17/0013 336/200 |
| 2006/0202776 A1* | 9/2006 | Lee | ............... | H01F 17/0013 333/25 |
| 2013/0154383 A1* | 6/2013 | Kasturi | ............... | H04B 5/0087 307/104 |

FOREIGN PATENT DOCUMENTS

JP   2013-513356   4/2013

* cited by examiner

*Primary Examiner* — Hal Kaplan
*Assistant Examiner* — Elim Ortiz
(74) *Attorney, Agent, or Firm* — JCIPRNET

(57) ABSTRACT

The invention provides a power supplying device, which includes a first coil; and a second coil, which is wound to be substantially line symmetrical to the first coil with respect to a center line, wherein the center line is an axis passing through a winding center of the first coil. A ground point of the first coil and the second coil is disposed further inside than an outermost winding of the first coil.

17 Claims, 13 Drawing Sheets

POWER SUPPLYING DEVICE

CROSS-REFERENCE TO RELATED APPLICATION

This application claims the priority benefits of Japanese patent application no. 2015-201835, filed on Oct. 13, 2015. The entirety of the above-mentioned patent application is hereby incorporated by reference herein and made a part of this specification.

BACKGROUND OF THE INVENTION

1. Field of the Invention

The invention relates to a power supplying device, and more particularly, to a power supplying device having coils.

2. Description of Related Art

In the conventional art, a power supplying device having coils is proposed (e.g., referring to Patent Document 1).

In Patent Document 1, a wireless power device having a first primary coil, a second primary coil and a differential driving amplifier is disclosed. Each of the first primary coil and the second primary coil is in a planer shape and wound into a spiral shape. Further, the first primary coil and the second primary coil are connected to the differential driving amplifier, and grounded at a position further outside than outermost windings of the first primary coil and the second primary coil. Also, the power supplying device is configured to make the first primary coil and the second primary coil generate electric fields with different polarities through the differential driving amplifier and make the first primary coil and the second primary coil generate magnetic fields with the same polarities for power supplying. As such, in the power supplying device of Patent Document 1, the magnetic fields for power supplying may be generated under the circumstance where the electric fields with different polarities generated by the first primary coil and the second primary coil are canceled by each other when viewing from afar.

PRIOR ART DOCUMENT

Patent Document

Patent Document 1: Japanese Patent Publication No. 2013-513356

SUMMARY OF THE INVENTION

However, in the power supplying device of Patent Document 1, although the magnetic fields for power supplying may be generated under the circumstance where the electric fields with different polarities generated by the first primary coil and the second primary coil are canceled by each other when viewing the power supplying device from afar, the first primary coil and the second primary coil are grounded at the position further outside than the outermost windings of the first primary coil and the second primary coil in the power supplying device of Patent Document 1. Therefore, when viewing at places close to the power supplying device, electric field distributions generated by the first primary coil and the second primary coil may be considered as asymmetric (a low symmetry) relative to winding centers of the first primary coil and the second primary coil. Thus, the power supplying device in Patent Document 1 is considered to include the following problem. Since the electric fields near the power supplying device are not fully canceled, it is difficult to suppress unnecessary field emission from generating.

The invention is proposed to solve the above problem. As one purpose of the invention, a power supplying device is provided to suppress the unnecessary field emission from generating at places close to the power supplying device in addition to places far from the power supplying device.

In order to achieve said purpose, the power supplying device according to one aspect of the invention includes: a first coil; and a second coil, wound to be substantially line symmetrical to the first coil with respect to a center line, wherein the center line is an axis passing through a winding center of the first coil. A ground point of the first coil and the second coil is provided further inside than an outermost winding of the first coil.

In order to achieve said purpose, in the power supplying device according to one aspect of the invention, as described above, the ground point of the first coil and the second coil is provided further inside than the outermost winding of the first coil. As such, electric field distributions generated by the first coil and the second coil may be formed with respect to the ground point, which is provided further inside than the outermost windings of the first coil, as the center. Therefore, in comparison with the circumstance where the ground point is provided further outside than the outermost winding of the first coil, the electric field distributions generated by the first coil and the second coil may be more approximate to a point symmetry (the symmetry is further improved) according to the invention. As a result, the unnecessary field emission may be suppressed from generating at place close to the power supplying device in addition to places far from the power supplying device.

In the power supplying device according to one aspect, preferably, the ground point may also be provided further inside than an innermost winding of the first coil. The ground point may also be disposed near the winding center of the first coil. The winding center of the first coil may also be identical to a winding center of the second coil. The ground point may also be provided on the winding center of the first coil and the winding center of the second coil. The ground point may also be provided on a position other than the winding center of the first coil and the winding center of the second coil. With such configuration, the electric field distributions generated by the first coil and the second coil may be more approximate to the point symmetry (the symmetry is further improved) so the unnecessary field emission may be further suppressed from generating near the power supplying device.

In the power supplying device according to one aspect, preferably, the first coil has a first end and a second end, the first coil has a spiral shape with the first end disposed inside and the second end disposed outside, and a first differential signal is inputted to the first end. The second coil has a third end and a fourth end, the second coil has a spiral shape with the third end disposed inside and the fourth end disposed outside, and a second differential signal having a polarity different from the first differential signal is inputted to the third end. In this case, preferably, the second end of the first coil and the fourth end of the second coil are disposed near the axis at positions for showing the substantial line symmetry with respect to the axis as the center line. With such configuration, the electric field distributions generated near the second end of the first coil and the fourth end of the second coil can show the substantial line symmetry so the symmetry of the electric field distributions generated by the first coil and the second coil may be effectively improved.

Further, the second end disposed at an outer end of the first coil (the outermost winding) and the fourth end disposed at an outer end of the second coil (the outermost winding) are opened, and the second coil is provided to be substantially line symmetrical to the first coil with respect to the axis as the center line. As such, unlike the circumstance where the second end of the first coil is connected with the fourth end of the second coil, the electric fields with different polarities may be generated at the second end of the first coil and the fourth end of the second coil according to the present invention. Therefore, the unnecessary field emission may be suppressed from generating even at places close to the end (i.e., the second end of the first coil and the fourth end of the second coil) on the outermost side (the outermost winding)

In the power supplying device according to one aspect, preferably, the first coil, the second coil and the ground point are provided on a wiring substrate (substrate) having multiple layers. With such configuration, a wiring pattern may be provided on the substrate having the multiple layers in order to form the first coil, the second coil and the ground point. As a result, unlike the circumstance where one single metal wire with greater dimensional error (device deviation) and greater thickness is used to form the first coil, the second coil and the ground point, a characteristic deviation may be suppressed from generating on the first coil and the second coil, and the thickness thereof may be suppressed from becoming greater.

In this case, preferably, the substrate includes a ground terminal, and the ground terminal is connected to an external ground and provided outside the first coil. The substrate includes: a plurality of intersected portions, the intersected portions being portions where the first coil and the second coil are intersected with each other when viewing from a direction perpendicular to a predetermined plane; and a connecting line, provided in at least one layer among the first layer and the second layer of the substrate, connected to the ground point and the ground terminal. Preferably, the connecting line is formed by surrounding at least a part of the intersected portions to show the substantial line symmetry with respect to the axis as the center line. With such configuration, the symmetry of the electric field distributions generated by the ground point may also be improved even under the circumstance where the first coil, the second coil and the ground point are provided in the first layer and the second layer of the substrate and the ground terminal is provided outside the first coil. As a result, the unnecessary field emission from the ground point may be suppressed, and the thickness of the substrate may be suppressed from becoming greater since the substrate requires no more than two layers. Further, the ground terminal may be connected to the external ground more easily when the ground terminal is provided on the substrate.

In the power supplying device in which the first coil, the second coil and the ground point are provided on the substrate, preferably, the substrate includes: a first terminal, connected to the first coil and one end of two output ends for outputting first and second differential signals, and provided outside the first coil; and a second terminal, connected to the second coil and another end of the two output ends, and provided outside the second coil. Also, preferably, the first coil and the second coil are provided in a same layer serving as a coil layer, and the ground point is provided in a ground layer different from the coil layer among the multiple layers. With such configuration, in comparison with the circumstance where the first coil and the second coil are provided in the same layer together with the ground point, the number of holes may be suppressed from increasing. The holes are provided to route the connecting line for connecting the ground point and the ground terminal back to the other layer in order to suppress the first coil and the second coil from overlapping on the same layer. As a result, increasing working hours of the substrate caused by the increasing number of the holes may be suppressed. Nonetheless, each of the first coil and the second coil may also be provided across a first layer and a second layer among the multiple layers of the substrate.

In the power supplying device in which the first coil, the second coil and the ground point are provided on the substrate, preferably, the substrate includes: an electric field shielding layer. The electric field shielding layer is connected to the ground point and formed to show the substantial line symmetry with respect to the axis as the center line. With such configuration, the electric fields generated by the first coil and the second coil may be shielded by the electric field shielding layer having the symmetry to more reliably suppress the unnecessary field emission from generating. In this case, the electric field shielding layer is provided by covering the first coil and the second coil.

The power supplying device may further include a differential power source, which outputs the first differential signal and the second differential signal from two output ends.

According to the invention, as described above, the unnecessary field emission may be suppressed from generating at places close to the power supplying device in addition to places far from the power supplying device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
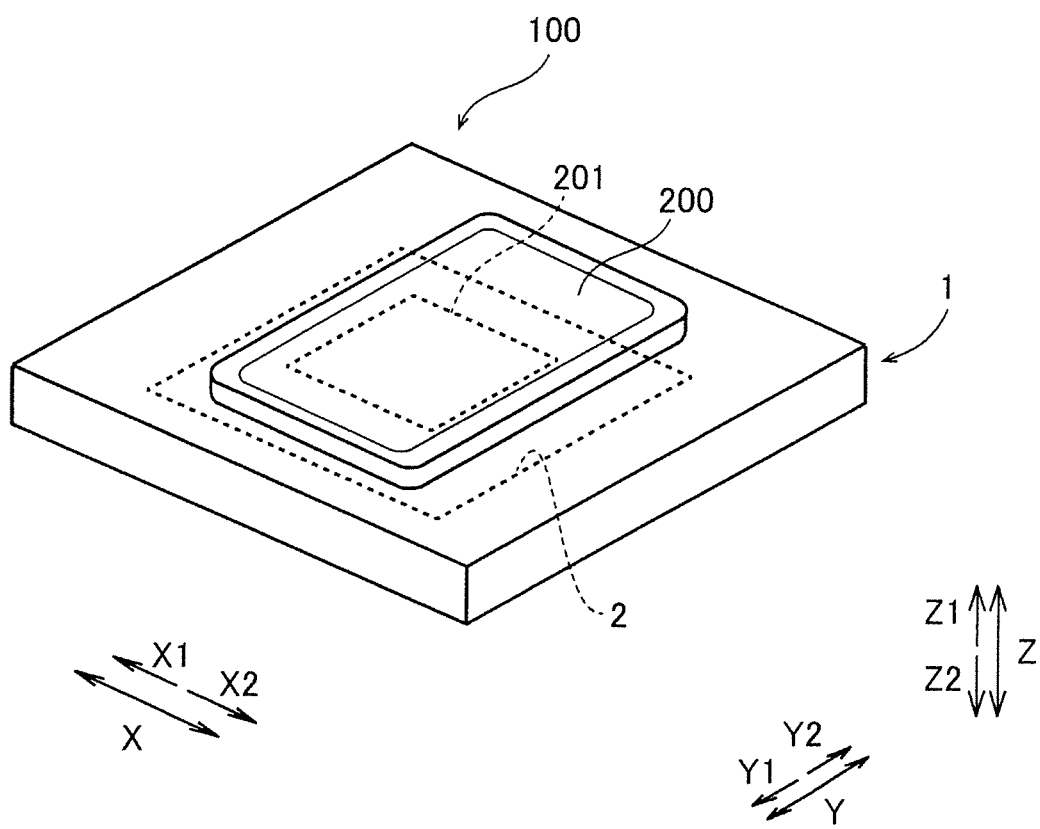
FIG. 1 is a three dimensional diagram showing overall configuration of a power supplying device according to the first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the invention are described below with reference to the accompanying drawings.

[First Embodiment]

Configuration of a power supplying device 100 according to the first embodiment of the invention is described below with reference to FIG. 1 to FIG. 3. As shown in FIG. 1, the power supplying device 100 of the first embodiment supplies power to a power receiving device 200 disposed near the power supplying device 100 in a magnetic resonance manner (used as a non contact power supplying device, a non contact point power supplying device or a wireless power supplying device) without disposing any wires or contact points between the power supplying device 100 and the power receiving device 200.

(Overall Configuration of the Power Supplying Device)

Figure 2:
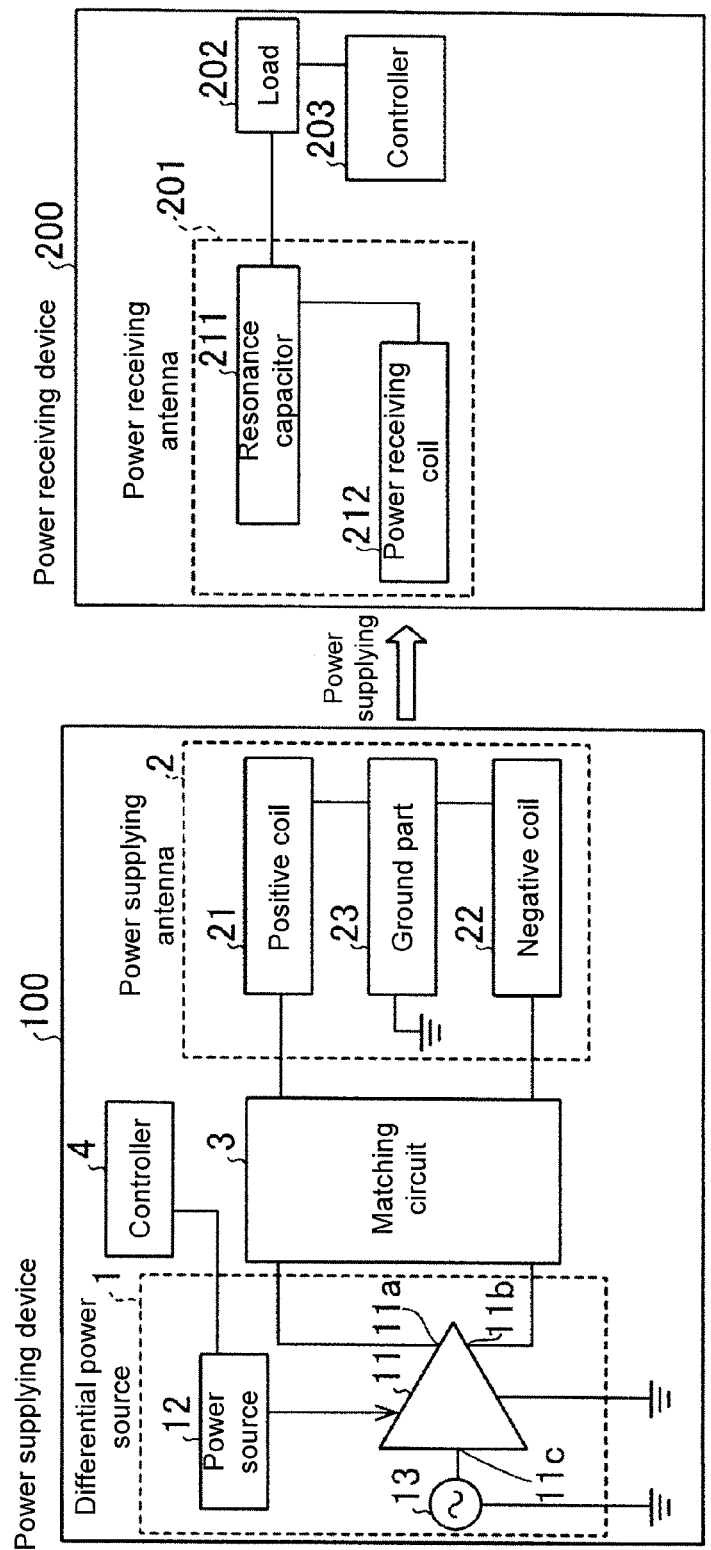
FIG. 2 is a block diagram showing configuration of the power supplying device according to the first embodiment of the invention.

As shown in FIG. 2, a differential power source 1 and a power supplying antenna 2 are provided in the power supplying device 100.

The differential power source 1 includes a positive output end 11a and a negative output end 11b and to output differential signals with different polarities from the positive output end 11a and the negative output end 11b. Further, the positive output end 11a is one example of "one end of the two output ends" in the claims. Also, the negative output end 11b is one example of "another end of the two output ends" in the claims.

The power supplying antenna 2 includes a positive coil 21, a negative coil 22 and a ground part 23. Further, the positive coil 21 is one example of "a first coil" in the claims. Also, the negative coil 22 is one example of "a second coil" in the claims.

Figure 3:
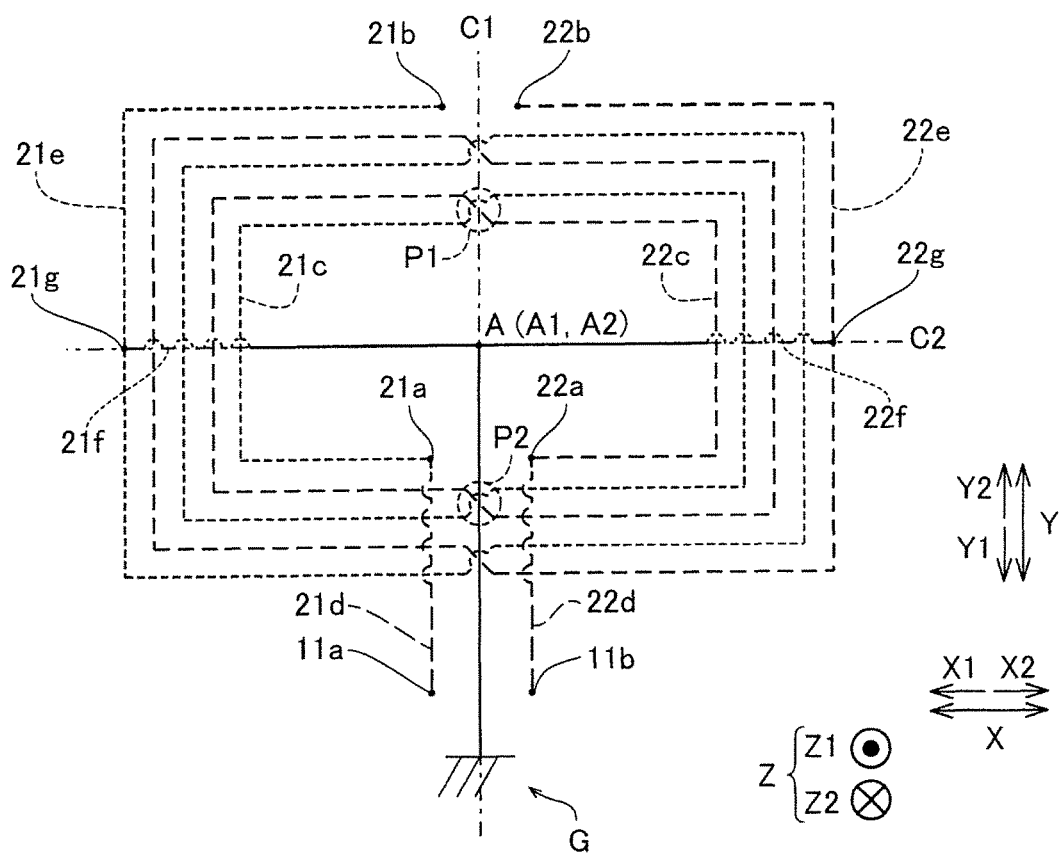
FIG. 3 is a plan view showing configuration of the power supplying antenna of the power supplying device according to the first embodiment of the invention.

Herein, in the first embodiment, as shown in FIG. 3, the positive coil 21 is wound into a spiral shape with a positive inner end 21a disposed inside and a positive outer end 21b disposed outside, and wound to show an substantial planar shape on a plane parallel to a XY plane. As an example, the positive inner end 21a is connected to the positive output end 11a. Also, the positive outer end 21b may be opened. Further, the positive inner end 21a is one example of "a first end" in the claims. Also, the positive outer end 21b is one example of "a second end" in the claims.

Specifically, in the first embodiment, the negative coil 22 is wound to be substantially line symmetry to the positive coil 21 with respect to a center line, wherein the center line is an axis C1 passing through a winding center (a symbol A1 in FIG. 3) of the positive coil 21 and extending in a direction substantially parallel to the positive coil 21 (substantially parallel to a Y-axis direction). The negative coil 22 is wound with a negative inner end 22a disposed inside and a negative outer end 22b disposed outside. That is, after rotating around the axis C1 for 180 degrees, the negative coil 22 is substantially identical to the positive coil 21. Here, as an example, the negative coil 22 is arranged in a manner that the negative inner end 22a is connected to the negative output end 11b. The negative outer end 22b may be opened. Further, the negative inner end 22a is one example of "a third end" in the claims. Also, the negative outer end 22b is one example of "a fourth end" in the claims.

Furthermore, in the first embodiment, a ground point A of the positive coil 21 and the negative coil 22 is provided further inside than outermost windings 21e and 22e of the positive coil 21 and the negative coil 22. Preferably, the ground point A is provided further inside than innermost windings 21c and 22c of the positive coil 21 and the negative coil 22.

(Configuration of each Part of the Power Supplying Device)

As shown in FIG. 2, the differential power source 1 includes a differential amplifying circuit 11, a power source 12 and an oscillator 13.

The power source 12 obtains a power from an external commercial power source (not illustrated) or a battery part (not illustrated). Further, the power source 12 converts the obtained power into a power having a voltage value based on a command of a controller 4. Also, the power source 12 provides the converted power to the differential amplifying circuit 11.

The oscillator 13 generates an AC signal with a predetermined frequency (e.g., 6.78 MHz). Further, the oscillator 13 inputs the generated AC signal to an input end 11c of the differential amplifying circuit 11.

The differential amplifying circuit 11 includes the so-call class E amplifying circuit, which is capable of realizing zero voltage switching. Further, the differential amplifying circuit 11 amplifies the AC signal inputted from the oscillator 13 by using the power from the power source 12 to serve as the differential signals to be outputted from the positive output end 11a and the negative output end 11b.

The positive coil 21 and the negative coil 22 of the power supplying antenna 2 are wound reversely to each other, as shown in FIG. 3. As such, when the positive coil 21 and the negative coil 22 are applied with the differential signals (having voltages with the polarity opposite to the other), a current can flow towards the same rotation direction so magnetic fields (magnetic fields for power supplying) with the same polarity may be generated. Further, the power supplying antenna 2 generates the magnetic fields for power supplying in order to supply the power to the power receiving device 200. At the time, the electric fields generated by the positive coil 21 and the negative coil 22 are canceled at least when viewing from afar.

Also, a matching circuit 3 and the controller 4 are provided in the power supplying device 100, as shown in FIG. 2.

The matching circuit 3 is provided between the differential power source 1 and the power supplying antenna 2. Further, the matching circuit 3 includes, for example, a resonance capacitor, and matches an impedance of the differential power source 1 with an impedance of the power supplying antenna 2.

The controller 4 controls operations of each part of the power supplying device 100. For example, the controller 4 changes the voltage value of the power source 12 in order to provide the desired power to the power receiving device 200.

(Configuration of the Power Supplying Antenna)

As shown in FIG. 3, the positive coil 21 includes, for example, a metal line, and is wound into the substantial planar shape on the plane parallel to the XY plane. Specifically, starting from the positive inner end 21a, the positive coil 21 is wired towards an arrow X1 direction and turned towards an arrow Y2 direction to form a rectangular shape showing a substantial line symmetry with respect to an axis C2 as a center line. Subsequently, at a portion P1 where the positive coil 21 and the axis C1 are intersected, the positive coil 21 is wired outwards in the X direction to intersect the axis C1, then wired towards an arrow X2 direction from the portion P1 and turned towards an arrow Y1 direction to form a rectangular shape showing the substantial line symmetry with respect to the axis C2 as the center line. Subsequently, at a portion P2 where the positive coil 21 and the axis C1 are intersected, the positive coil 21 is wired outwards in the X direction to intersect the axis C1, then wired towards the arrow X1 direction from the portion P2 and turned towards the arrow Y2 direction to form a rectangular shape showing the substantial line symmetry with respect to the axis C2 as the center line. By repeating the above process, the positive coil 21 may be wounded into the spiral shape with a winding center A1, wherein the winding center A1 is a point where the axis C1 and the axis C2 are intersected.

A connecting line 21d is provided between the positive inner end 21a of the positive coil 21 and the positive output end 11a. One end of the connecting line 21d is connected to the positive inner end 21a and wired towards outside (on an arrow Y1 direction side). Further, another end of the connecting line 21d is connected to the positive output end 11a.

Here, in the first embodiment, the positive coil 21 includes a connecting line 21f. The connecting line 21f connects the ground point A to the outermost winding 21e (on an arrow X1 direction side) of the positive coil 21. When viewing from an arrow Z1 direction side (in plan view), the connecting line 21f is wired from the ground point A along the axis C2 and connected to a point 21g. The point 21g is a center point of the winding 21e of the positive coil 21, and is a position corresponding to an intersection of the winding 21e and the axis C2.

Further, the negative coil 22 is wound to be substantially line symmetrical to the positive coil 21 with respect to the axis C1 as the center line. Also, the negative coil 22 is wound reversely with respect to the positive coil 21. Here, a winding center A2 of the negative coil 22 is at a position substantially identical to a position of the winding center A1 of the positive coil 21, and is the intersection of the axis C1 and the axis C2. Further, the positive coil 21 and the negative coil 22 are connected at the ground point A.

Further, a connecting line 22d is provided between the negative inner end 22a of the negative coil 22 and the negative output end 11b. The connecting line 22d is disposed at a position to be substantially line symmetrical to the connecting line 21d of the positive coil 21 with respect to the axis C1.

Further, the negative coil 22 includes a connecting line 22f. The connecting line 22f connects the ground point A to the outermost winding 22e (on an arrow X2 direction side) of the negative coil 22. The connecting line 22f is wired from the ground point A towards the axis C2 and connected to a point 22g. The point 22g is a center point of the winding 22e of the negative coil 22, and is a point where the winding 22e and the axis C2 are intersected. Further, the connecting line 22f and the point 22g are respectively disposed at positions to be substantially line symmetrical to the connecting line 21f and the point 21g of the positive coil 21 with respect to the axis C1 as the center line.

Here, in the first embodiment, the ground point A is provided further inside than the outermost windings 21e and 22e of the positive coil 21 and the negative coil 22. Preferably, the ground point A is provided further inside than the innermost windings 21c and 22c of the positive coil 21 and the negative coil 22. Further, preferably, the ground point A is disposed near the winding center A1 of the positive coil 21 and the winding center A2 of the negative coil 22. More preferably, the ground point A is disposed at a position identical to the positions of the winding center A1 of the positive coil 21 and the winding center A2 of the negative coil 22. In addition, FIG. 3 illustrates the circumstance where the ground point A is disposed at a position substantially identical to the positions of the winding center A1 of the positive coil 21 and the winding center A2 of the negative coil 22.

Also, in the first embodiment, the positive outer end 21b of the positive coil 21 and the negative outer end 22b of the negative coil 22 are disposed near the axis C1 at positions for showing the substantial line symmetry with respect to the axis C1 as the center line. Specifically, the positive outer end 21b is provided on the outermost winding 21e of the positive coil 21. Further, the negative outer end 22b is provided on the outermost winding 22e of the negative coil 22. Also, the positive outer end 21b and the negative outer end 22b are disposed near the axis C1 facing each other with the axis C1 spaced in between. Also, the positive outer end 21b and the negative outer end 22b are not connected to any wiring but opened.

Further, the positive outer side 21b is disposed on an arrow Y2 direction side relative to the axis C2, and the positive inner end 21a is disposed on the arrow Y1 direction side relative to the axis C2. Further, the negative outer side 22b is disposed on the arrow Y2 direction side relative to the axis C2, and the negative inner end 22a is disposed on the arrow Y1 direction side relative to the axis C2.

(Configuration of the Power Receiving Device)

Next, configuration of the power receiving device 200 is described below with reference to FIG. 2.

The power receiving device 200 includes, for example, a smartphone. Further, a power receiving antenna 201, a load 202 and a controller 203 are provided in the power receiving device 200.

The power receiving antenna 201 includes a resonance capacitor 211 and a power receiving coil 212. The power receiving antenna 201 receives the power from the power supplying device 100 through a magnetic field coupling between the power receiving coil 212 and the power supplying antenna 2.

The load 202 is, for example, a circuit or a battery part which consumes the power for realizing various functions of the power receiving device 200 (e.g., functions of the smartphone).

The controller 203 controls operations of each part of the power receiving device 200.

(Comparison Between Electric Field Distributions of the Power Supplying Antenna)

Next, referring to FIG. 4 to FIG. 6, a comparison between electric field distributions generated by the power supplying antenna 2 (the positive coil 21 and the negative coil 22) of the power supplying device 100 in the first embodiment and electric field distributions generated by a power supplying device in a reference example is described as follows.

Figure 4:
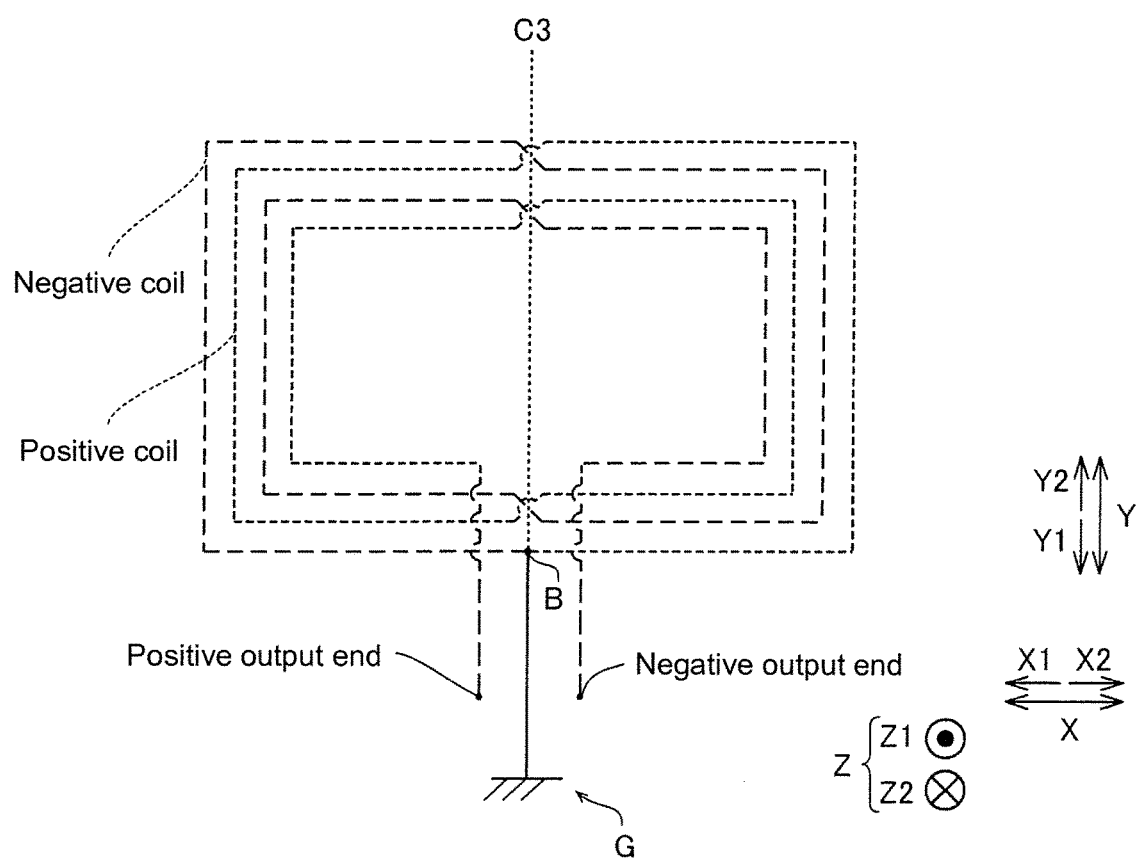
FIG. 4 is a diagram showing configuration of the power supplying antenna according to the reference example.

FIG. 4 is a schematic diagram illustrating configuration of the power supplying device in the reference example. FIG. 5 is a schematic diagram illustrating shapes and the electric field distributions of coils of the power supplying device in the reference example. Aforesaid power supplying device is provided with a positive coil and a negative coil, which are wound to show a line symmetry with an axis C3 as a center line. Further, the positive coil and the negative coil are wound reversely to each other. Further, in aforesaid power supplying device, a ground point B is provided on outermost windings of the positive coil or the negative coil. The ground point B is provided on the arrow Y1 direction side of the power supplying device and on the axis C3.

Figure 5:
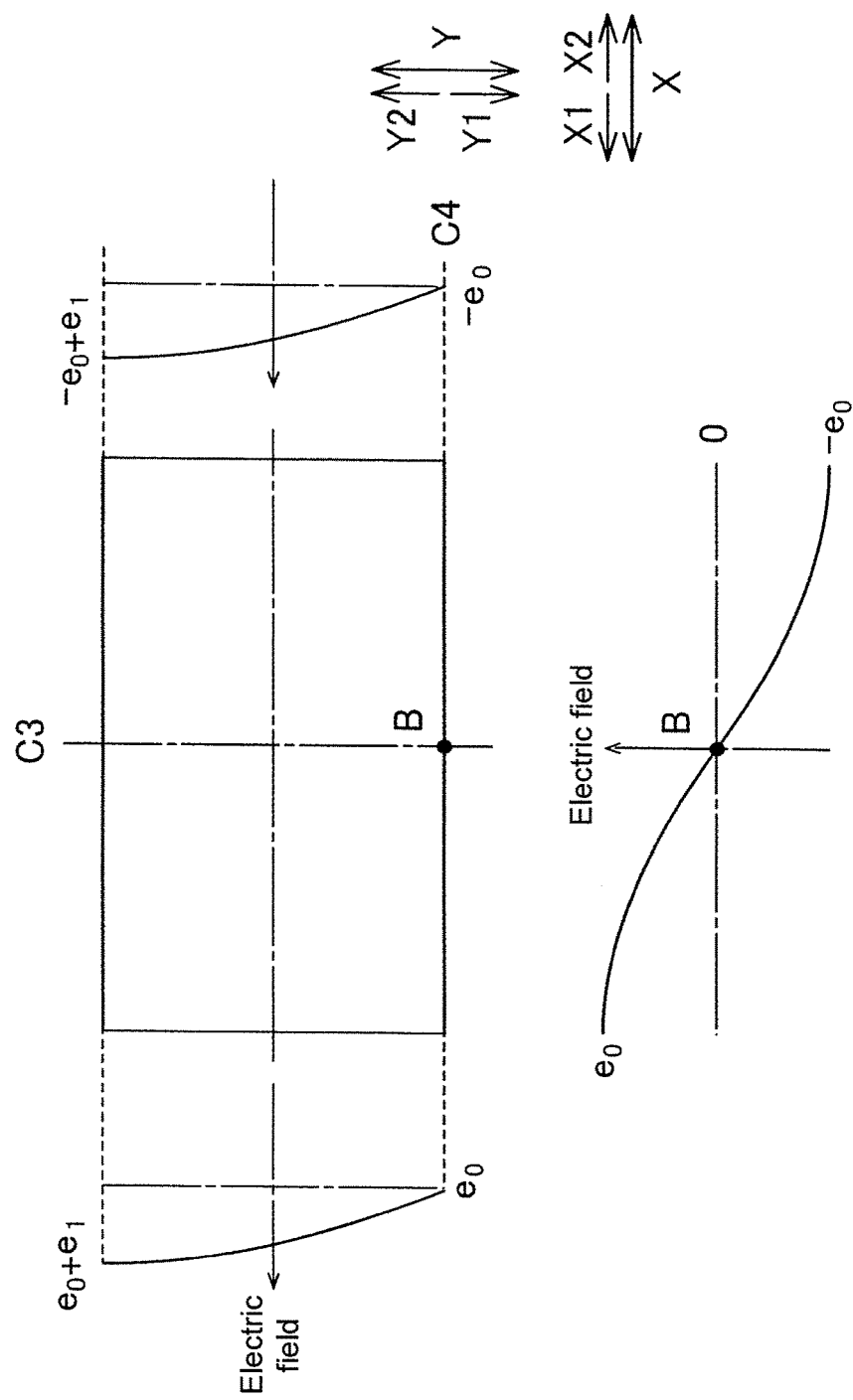
FIG. 5 is a diagram illustrating the electric field distributions of the power supplying antenna according to the reference example.

As shown in FIG. 5, the electric field distributions of the power supplying device in the reference example are generated to show a point symmetry with respect to the ground point B as a center point along a line C4 including the ground point B in the X direction. That is, the electric field distribution starts with 0 and gradually reaches $e_0$ from the ground point B towards the arrow X1; on the other side, the electric field distribution starts with 0 and gradually reaches $-e_0$ from the ground point B towards the arrow X2. In this case, the field emission is suppressed at the mentioned part.

Further, the electric field distribution of the power supplying device in the reference example on the arrow X1 direction side is generated in gradually increasing manner from the arrow Y1 direction side towards the arrow Y2 direction side (changing from $e_0$ to $e_0+e_1$) rather than showing the point symmetry. In this case, the field emission will be generated since the electric fields near the power supplying device (within a range affected by the electric field distributions of the coils) are not canceled.

Further, the electric field distribution of the power supplying device in the reference example on the arrow X2 direction side is generated in gradually increasing manner from the arrow Y1 direction side towards the arrow Y2 direction side (changing from $-e_0$ to $-e_0+e_1$) rather than showing the point symmetry. In this case, the field emission will still be generated since the electric fields are not canceled.

Therefore, in the power supplying device in the reference example, the field emission will be generated since the electric fields near the power supplying device are not canceled.

Figure 6:
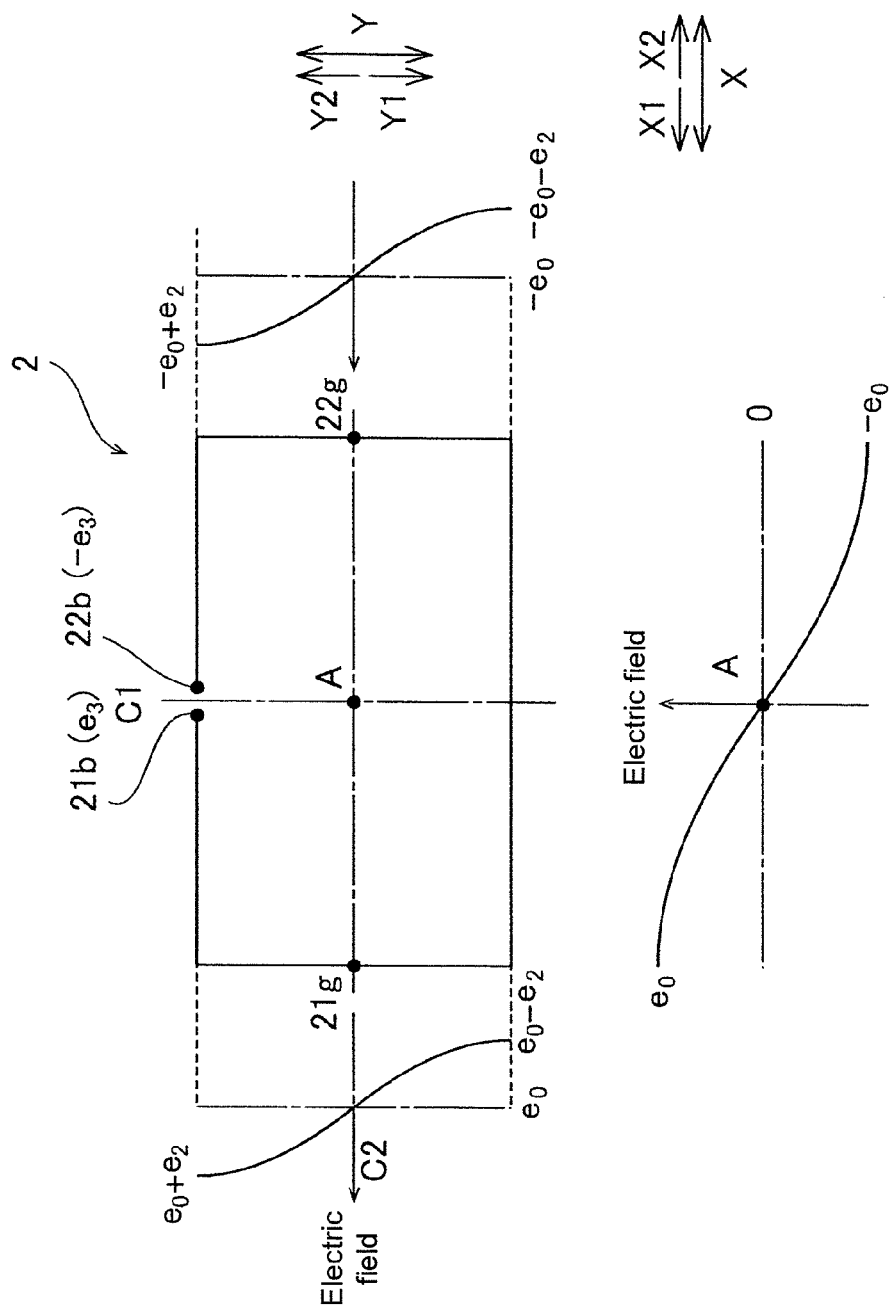
FIG. 6 is a diagram illustrating the electric field distributions of the power supplying antenna according to the first embodiment of invention.

On the other hand, as shown in FIG. 6, the electric field distribution of the power supplying device 100 in the first embodiment is generated to show the point symmetry with respect to the ground point A as a center point in the X direction. That is, the electric field distribution starts with 0 and gradually reaches $e_0$ from the ground point A towards the arrow X1; on the other side, the electric field distribution starts with 0 and gradually reaches $-e_0$ from the ground point A towards the arrow X2. In this case, the field emission is suppressed.

Further, the electric field distribution of the power supplying device 100 in the first embodiment on the arrow X1 direction side is generated to show a point symmetry with the point 21g as a center point in the Y direction. That is, the electric field distribution starts with $e_0$ and gradually reaches $e_0-e_2$ from the point 21g towards the arrow Y1; on the other side, the electric field distribution starts with $e_0$ and gradually reaches $e_0+e_2$ from the point 21g towards the arrow Y2. In this case, the field emission near the power supplying device 100 (within a range affected by the electric field distributions of the positive coil 21 and the negative coil 22 (e.g., a range in which the power receiving device 200 is disposed)) may also be suppressed.

Further, the electric field distribution of the power supplying device 100 in the first embodiment on the arrow X2 direction side is generated to show a point symmetry with the point 22g as a center point in the Y direction. That is, the electric field distribution starts with $-e_0$ and gradually reaches $-e_0-e_2$ from the point 22g towards the arrow Y1; on the other side, the electric field distribution starts with $-e_0$ and gradually reaches $-e_0+e_2$ from the point 22g towards the arrow Y2. In this case, the field emission may also be suppressed even at places close to the power supplying device 100.

Therefore, in the power supplying device 100 of the first embodiment, the field emission may be suppressed and the electric fields may be canceled even at places close to the power supplying device 100.

Further, the electric field distributions of the power supplying device 100 in the first embodiment are generated to show the point symmetry with respect to the ground point A as the center point. As such, the field emission may be suppressed when the electric field distributions of the power supplying device 100 become substantially 0 after averaging (aggregating).

In addition, in the power supplying device 100 of the first embodiment, an electric field (potential) of the positive outer end 21b is $e_3$, and an electric field (potential) of the negative outer end 22b is $-e_3$. That is, the positive outer end 21b and the negative outer end 22b have the potentials with polarities different from each other.

[Effects of the First Embodiment]

The following effects may be obtained according to the first embodiment.

In the first embodiment, as described above, the ground point A of the positive coil 21 and the negative coil 22 is provided further inside than the outermost windings 21e and 22e of the positive coil 21 and the negative coil 22. Preferably, the ground point A is provided further inside than the innermost windings 21c and 22c of the positive coil 21 and the negative coil 22. As such, the electric field distributions generated by the positive coil 21 and the negative coil 22 may be formed with respect to the ground point A, which is provided further inside than the innermost windings 21c and 22c of the positive coil 21 and the negative coil 22, as the center. Therefore, in comparison with the circumstance where the ground point A is provided further outside than the outermost winding 21e of the positive coil 21, when the ground point A is further inside, the electric field distributions generated by the positive coil 21 and the negative coil 22 may be more approximate to the point symmetry (the symmetry is further improved). As a result, the unnecessary field emission may be suppressed from generating at places close to the power supplying device 100 in addition to places far from the power supplying device 100. Further, the positive outer end 21b provided in the outermost winding 21e of the positive coil 21 and the negative outer end 22b provided in the outermost winding 22e of the negative coil 22 are opened, and the negative coil 22 is provided to be substantially line symmetrical to the positive coil 21 with respect to the axis C1 as the center line. As such, unlike the circumstance where the positive outer end 21b of the positive coil 21 is connected to the negative outer end 22b of the negative coil 22, the electric fields with different polarities ($e_3$ and $-e_3$) are generated by the positive outer end 21b of the positive coil 21 and the negative outer end 22b of the negative coil 22. Therefore, the unnecessary field emission may be suppressed from generating even at places close to the positive outer end 21b and the negative outer end 22b.

Further, in the first embodiment, as described above, the ground point A is disposed near the winding center A1 of the positive coil 21. As such, the electric field distributions generated by the positive coil 21 and the negative coil 22 may be more approximate to the point symmetry (the symmetry is further improved) so the unnecessary field emission may be further suppressed from generating near the power supplying device 100.

Also, in the first embodiment, as described above, the ground point A is disposed on the winding center A1 of the positive coil 21, and the positive coil 21 and the negative coil 22 are provided in such way that the electric field distributions of the positive coil 21 and the negative coil 22 show a substantial point symmetry. As such, the electric field distributions generated by the positive coil 21 and the negative coil 22 can show the substantial point symmetry so the unnecessary field emission may be further suppressed from generating near the power supplying device 100.

Also, in the first embodiment, as described above, the positive outer end 21b of the positive coil 21 and the negative outer end 22b of the negative coil 22 are disposed near the axis C1 at positions for showing the substantial line symmetry with respect to the axis C1 as the center line. As such, the electric fields generated near the positive outer end 21b of the positive coil 21 and the negative outer end 22b of the negative coil 22 can show the substantial line symmetry with respect to the axis C1 as the center line. Therefore, the symmetry of the electric field distributions generated by the positive coil 21 and the negative coil 22 may be effectively improved.

[Second Embodiment]

Next, configuration of a power supplying device 300 according to the second embodiment is described below with reference to FIG. 7 and FIG. 8. In the power supplying device 300 of the second embodiment, a positive coil 321, a negative coil 322 and a ground part 323 are provided on a wiring substrate (substrate) 301 having multiple layers (two layers). Further, the components similar to those in the first embodiment are marked with the same reference numbers and related descriptions thereof are omitted hereinafter.

(Configuration of the Power Supplying Device in the Second Embodiment)

Figure 7:
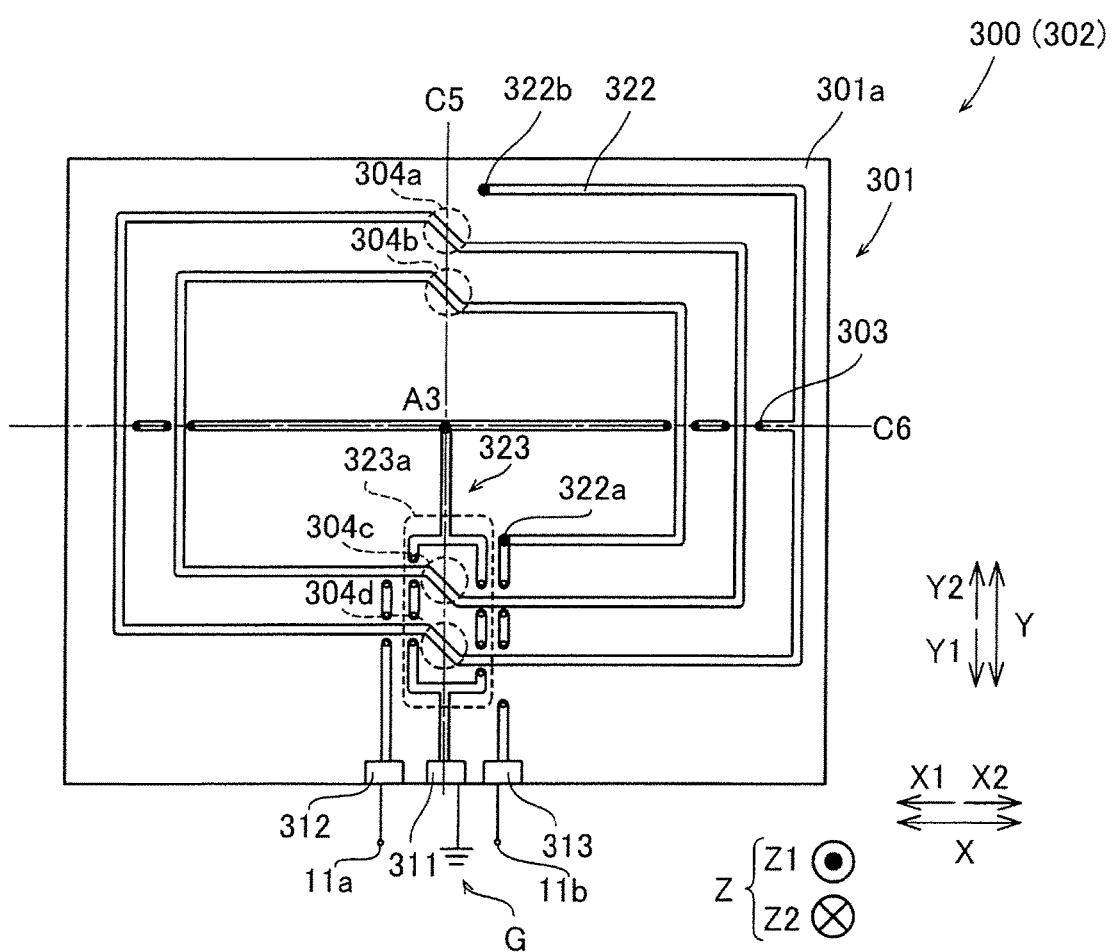
FIG. 7 is a plan view showing configuration of the first layer of the wiring substrate (substrate) of the power supplying device according to the second embodiment of the invention.

As shown in FIG. 7, the power supplying device 300 of the second embodiment includes a power supplying antenna 302. The power supplying antenna 302 includes the wiring substrate 301.

Figure 8:
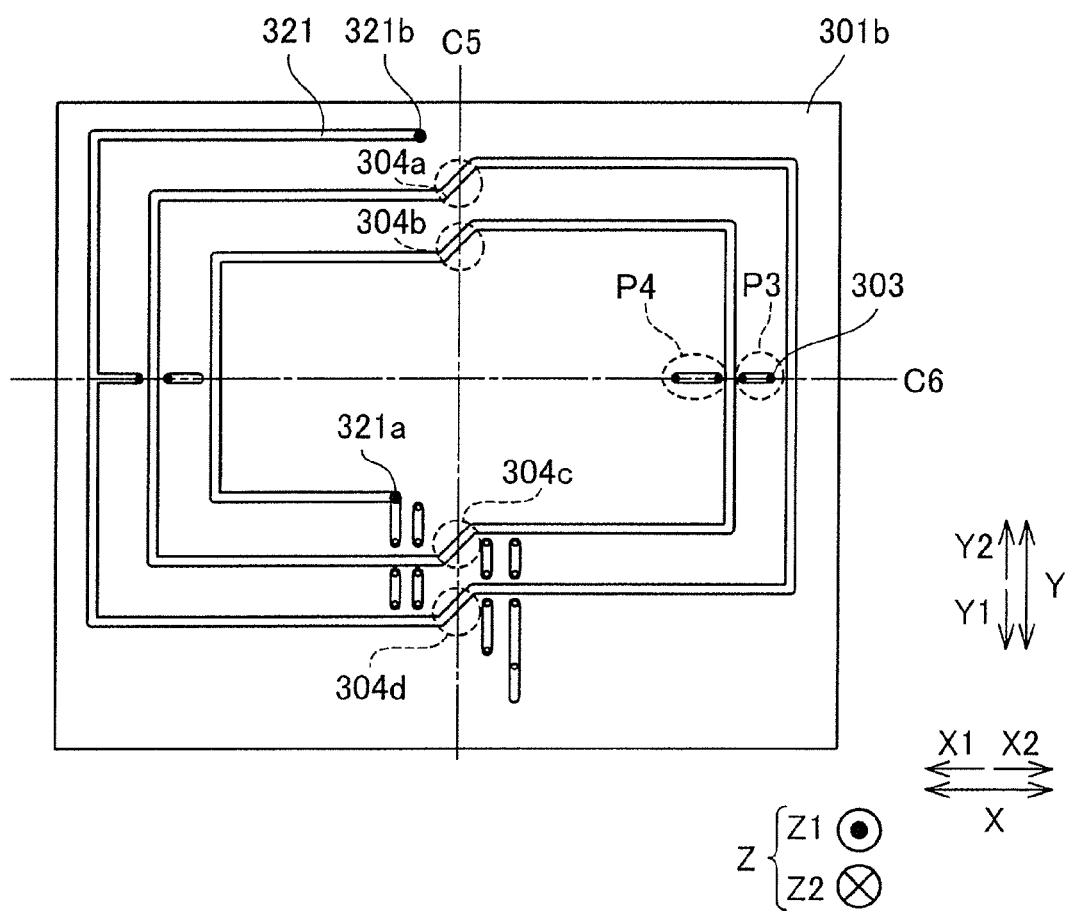
FIG. 8 is a plan view showing configuration of the second layer of the wiring substrate of the power supplying device according to the second embodiment of the invention.

Here, in the second embodiment, as shown in FIG. 7 and FIG. 8, the wiring substrate 301 has the multiple layers (e.g., two layers). Specifically, the wiring substrate 301 has a first layer 301a and a second layer 301b. Further, the wiring substrate 301 forms a pattern through conductors on the first layer 301a and the second layer 301b of the wiring substrate 301 to form a wiring pattern. For example, the first layer 301a and the second layer 301b serve as a surface side and a rear side of the wiring substrate 301. Further, the first layer 301a is one example of "a first layer" in the claims. Further, the second layer 301b is one example of "a second layer" in the claims.

Also, in the second embodiment, the positive coil 321, the negative coil 322 and the ground part 323 are provided on the wiring substrate 301. Also, each of the positive coil 321, the negative coil 322 and the ground part 323 is provided across the first layer 301a and the second layer 301b of the wiring substrate 301.

Specifically, as shown in FIG. 7 and FIG. 8, the negative coil 322 and the ground part 323 are provided in the first layer 301a of the wiring substrate 301. Further, the positive coil 321 is provided in the second layer 301b of the wiring substrate 301. Also, multiple (23) holes 303 are provided on the first layer 301a and the second layer 301b. As such, the wiring pattern is provided on the wiring substrate 301 by the following method. First of all, portions (e.g., a portion P3 and a portion P4 in FIG. 8) of the positive coil 321, the negative coil 322 and the ground part 323 are routed to the respective layer on the other side via the holes 303 without intersecting with one another on the same layer.

Then, the positive coil 321 and the negative coil 322 are respectively formed on the wiring substrate 301 to show a substantial line symmetry with an axis C5 as a center line.

Further, the positive coil 321 and the negative coil 322 are similar to the power supplying device 100 in the first embodiment in that, a ground point A3 is provided at a position substantially identical to positions of a winding center of the positive coil 321 and a winding center of the negative coil 322 (a point where the axis C5 and an axis C6 are intersected). Further, as similar to the power supplying device 100 in the first embodiment, the positive coil 321 and the negative coil 322 are provided in such way that electric field distributions generated by the positive coil 321 and the negative coil 322 show a substantial point symmetry.

Here, in the second embodiment, the wiring substrate 301 includes: intersection portions 304a to 304d, and the intersected portions 304a to 304d being portions where the positive coil 321 and the negative coil 322 are intersected to each other when viewing from the arrow Z1 direction side; a ground terminal 311, connected to a ground G and provided outside the positive coil 321; and a connecting line 323a, provided in the first layer 301a and the second layer 301b of the wiring substrate 301, connected to the ground point A3 and the ground terminal 311, and formed by surrounding the intersected portion 304c and the intersected portion 304d among the intersected portions 304a to 304d to show the substantial line symmetry with respect to the axis C5 as the center line.

Specifically, the ground terminal 311, a positive terminal 312 and a negative terminal 313 are provided on the first layer 301a outside the negative coil 322 (the positive coil 321) and near the end of the arrow Y1 direction side. The ground terminal 311 is connected to the ground G (grounded). The positive terminal 312 is connected to the positive output end 11a. The negative terminal 313 is connected to the negative output end 11b.

A positive inner end 321a of the positive coil 321 is connected to the positive terminal 312. A negative inner end 322a of the negative coil 322 is connected to the negative terminal 312. Further, the ground point A3 is connected to the ground terminal 311 via the connecting line 323a.

Also, the portions where the negative coil 322 of the first layer 301a and the axis C5 are intersected (the intersected portions 304a to 304d) are intersected with the portions where the negative coil 322 of the second layer 301a and the axis C5 (the intersected portions 304a to 304d) are intersected when viewing from the arrow Z1 direction side. Further, the connecting line 323a is wired by forming a rectangular shape by surrounding the intersected portion 304c and the intersected portion 304d to show the substantial line symmetry with respect to the axis C5 as the center line, as shown in FIG. 7.

In addition, both a positive outer end 321b of the positive coil 321 and a negative outer end 322b of the negative coil 322 are also opened as similar to the positive outer end 21b and the negative outer end 22b of the power supplying device 100 in the first embodiment.

Further, the rest of configuration of the power supplying device 300 in the second embodiment is similar to those of the power supplying device 100 in the first embodiment.

[Effects of the Second Embodiment]

The following effects may be obtained according to the second embodiment.

In the second embodiment, as described above, the positive coil 321, the negative coil 322 and the ground part 323 are provided on the wiring substrate 301 having the multiple layers (the first layer 301a and the second layer 301b). As such, the wiring pattern may be provided on the wiring substrate 301 having the multiple layers (the first layer 301a and the second layer 301b) in order to form the positive coil 321, the negative coil 322 and the ground part 323. As a result, unlike the circumstance where one single metal wire with greater dimensional error (device deviation) and greater thickness is used to form the positive coil 321, the negative coil 322 and the ground part 323, a characteristic deviation may be suppressed from generating on the positive coil 321 and the negative coil 322, and the thickness thereof may be suppressed from becoming greater.

Further, in the second embodiment, the positive coil 321 and the negative coil 322 are provided across the first layer 301a and the second layer 301b of the wiring substrate 301. Moreover, the wiring substrate 301 is disposed with: the intersection portions 304a to 304d, and the intersected portions 304a to 304d being the portions where the positive coil 321 and the negative coil 322 are intersected to each other when viewing from the arrow Z1 direction side; the ground terminal 311, connected to the ground G and provided outside the positive coil 321; and the connecting line 323a, provided in the first layer 301a and the second layer 301b of the wiring substrate 301, connected to the ground point A3 and the ground terminal 311, and formed by surrounding the intersected portion 304c and the intersected portion 304d among the intersected portions 304a to 304d to show the substantial line symmetry with respect to the axis C5 as the center line. As such, the symmetry of the electric field distributions generated by the ground part 323 may also be improved even under the circumstance where the positive coil 321, the negative coil 322 and the ground part 323 are provided in the first layer 301a and the second layer 301b of the wiring substrate 301 and the ground terminal 311 is provided outside the positive coil 321. As a result, the unnecessary field emission from the ground part 323 may be suppressed, and the thickness of the wiring substrate 301 may be suppressed from becoming greater since the wiring substrate 301 requires no more than two layers (the first layer 301a and the second layer 301b). Further, the ground terminal 311 may be connected to the ground G more easily when the ground terminal 311 is provided on the wiring substrate 301.

Further, other effects of the power supplying device 300 of the second embodiment are similar to those of the power supplying device 100 in the first embodiment.

[Third Embodiment]

Next, configuration of a power supplying device 400 according to the third embodiment is described below with reference to FIG. 9 and FIG. 10. In the power supplying device 400 of the third embodiment, a positive coil 421 and a negative coil 422 are provided in a second layer 401b being the same layer, and a ground part 423 is provided in a first layer 401a. Further, the components similar to those in the first embodiment or the second embodiment are marked with the same reference numbers and related descriptions thereof are omitted hereinafter.

(Configuration of the Power Supplying Device in the Third Embodiment)

Figure 9:
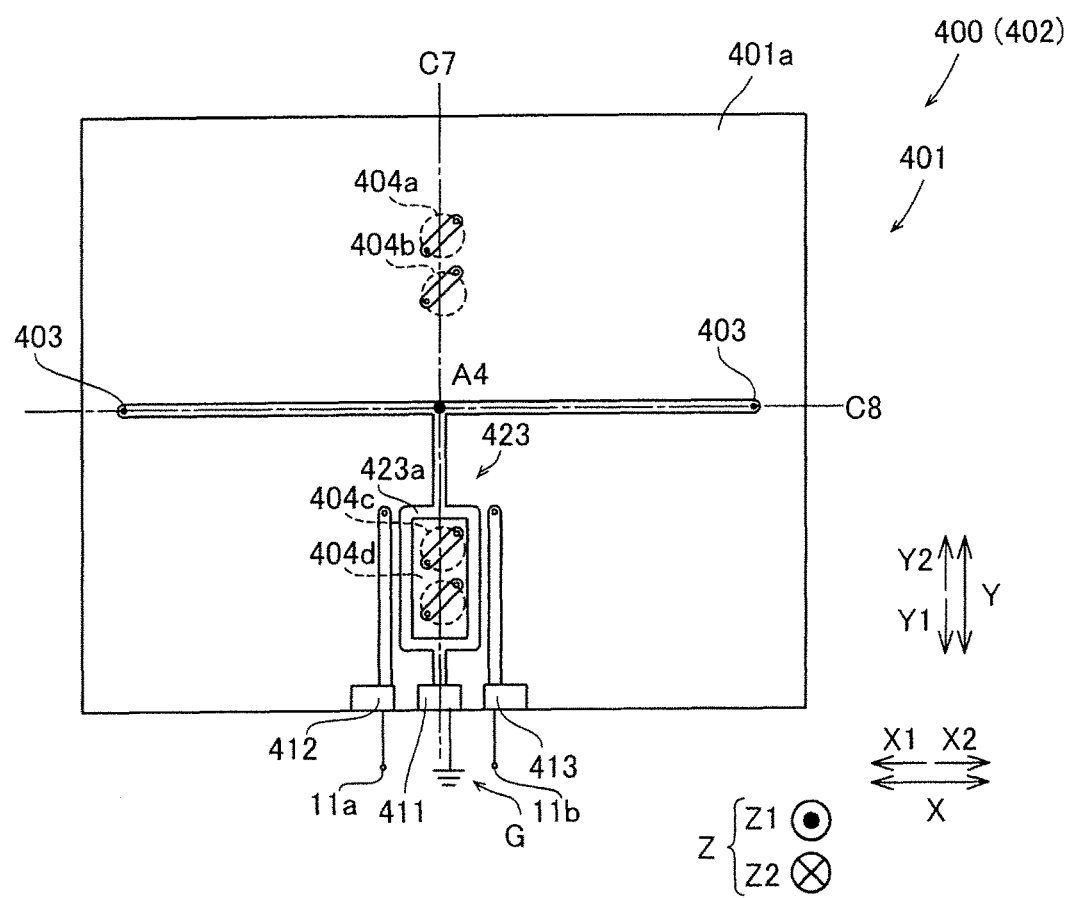
FIG. 9 is a plan view showing configuration of the first layer of the wiring substrate of the power supplying device according to the third embodiment of the invention.
Figure 10:
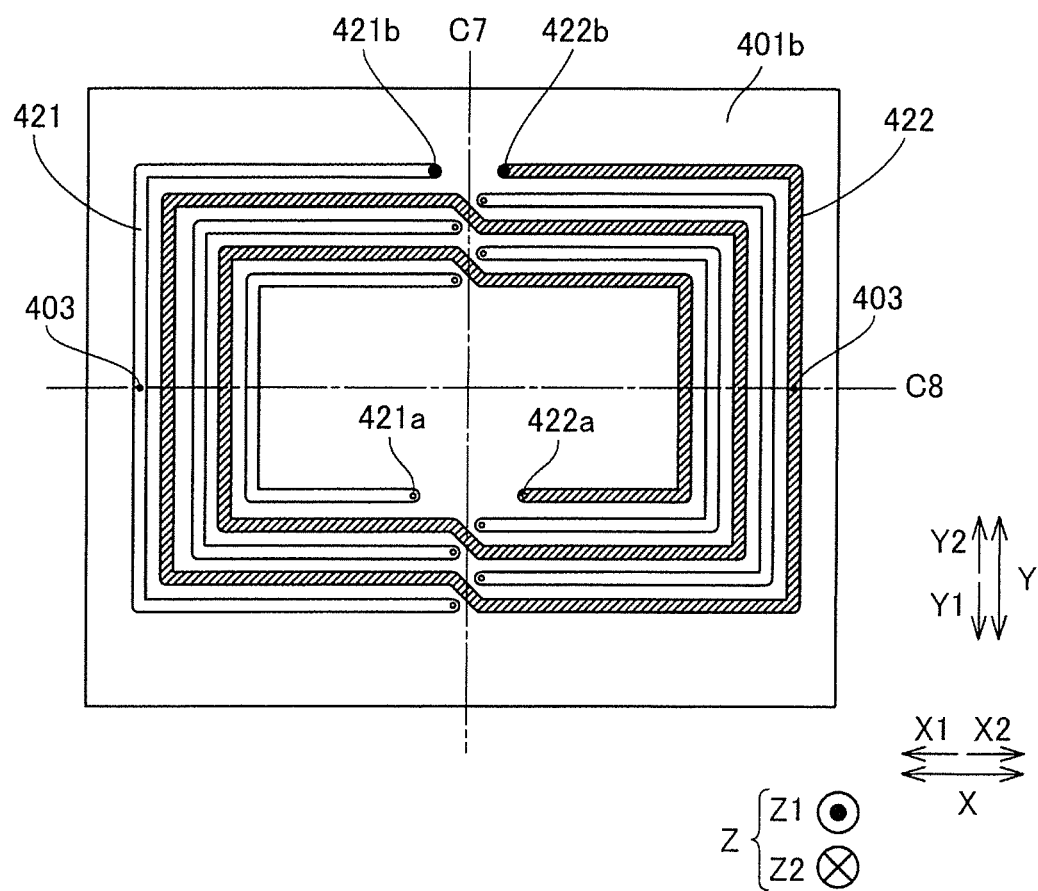
FIG. 10 is a plan view showing configuration of the second layer of the wiring substrate of the power supplying device according to the third embodiment of the invention.

As shown in FIG. 9, the power supplying device 400 of the third embodiment includes a power supplying antenna 402. The power supplying antenna 402 includes the wiring substrate 401.

The wiring substrate 401 has multiple layers (e.g., two layers) including the first layer 401a and the second layer 401b. Further, the first layer 401a is one example of "a ground layer" in the claims. Further, the second layer 401b is one example of "a coil layer" in the claims.

Here, in the third embodiment, the wiring substrate 401 includes: a positive terminal 412, connected to a positive inner end 421a of the positive coil 421 and the positive output end 11a, and provided outside the positive coil 421; a negative terminal 413, connected to a negative inner end 422a of the negative coil 422 and the negative output end 11b, and provided outside the negative coil 422; and a ground terminal 411, connected to a ground point A4 (the ground part 423) and a ground G, and provided outside the positive coil 421. Further, the wiring substrate 401 includes the positive coil 421 and the negative coil 422 provided in the second layer 401b being the same layer, and the ground part 423 provided in the first layer 401a. Further, the positive terminal 412 is one example of "a first terminal" in the claims. Further, the negative terminal 413 is one example of "a second terminal" in the claims.

Specifically, the ground part 423 is provided in the first layer 401a of the wiring substrate 401. Further, the positive coil 421 and the negative coil 422 are provided in the second layer 401b of the wiring substrate 401. Also, multiple (12) holes 403 are provided on the first layer 401a and the second layer 401b. As such, a wiring pattern may be provided by partially routing the positive coil 421 of the wiring substrate 401 back to the first layer 401a via the holes 403 without intersecting with the negative coil 422 on the same layer.

Then, the positive coil 421 and the negative coil 422 are formed on the second layer 401b of the wiring substrate 401 to show a substantial line symmetry with an axis C7 as a center line.

Further, the positive coil 421 and the negative coil 422 are similar to the power supplying device 100 in the first embodiment in that, a ground point A4 is provided at a position substantially identical to positions of a winding center of the positive coil 421 and a winding center of the negative coil 422 (a point where the axis C7 and an axis C8 are intersected). Further, as similar to the power supplying device 100 in the first embodiment, the positive coil 421 and the negative coil 422 are provided in such way that electric field distributions generated by the positive coil 421 and the negative coil 422 show a substantial point symmetry.

Further, as similar to the connecting line 323a of the second embodiment, a connecting line 423a is formed by surrounding an intersected portion 404c and an intersected portion 404d among intersected portions 404a to 404d to show the substantial line symmetry with respect to the axis C7 as the center line.

Further, the rest of configuration of the power supplying device 400 in the third embodiment is similar to those of the power supplying device 100 in the first embodiment.

[Effects of the Third Embodiment]

The following effects may be obtained according to the third embodiment.

In the third embodiment, as described above, the wiring substrate 401 includes: the positive terminal 412, connected to the positive inner end 421a of the positive coil 421 and the positive output end 11a, and provided outside the positive coil 421; the negative terminal 413, connected to the negative inner end 422a of the negative coil 422 and the negative output end 11b, and provided outside the negative coil 422; and the ground terminal 411, connected to the ground point A4 (the ground part 423) and the ground G, and provided outside the positive coil 421. Further, the wiring substrate 401 includes the positive coil 421 and the negative coil 422 provided in the second layer 401b being the same layer, and the ground part 423 provided in the first layer 401a. As such, in comparison with the circumstance where the positive coil 421 and the negative coil 422 are provided in the same layer together with the ground point A4, the number of the holes may be suppressed from increasing. The holes are provided to route the connecting line 423a for connecting the ground point A4 and the ground terminal 411 back to the other layer in order to suppress the positive coil 421 and the negative coil 422 from overlapping on the same layer. As a result, increasing working hours of the wiring substrate 401 caused by the increasing number of the holes 403 may be suppressed. In addition, in the power supplying device 300 of the second embodiment, the number of the holes 303 is 23 under the circumstance where the different layers are provided and the ground point A3 is provided in any one of the layers excluding the layer in which the positive coil 321 and the negative coil 322. On the other hand, the number of the holes 403 is 12 in the power supplying device 400 of the third embodiment so the number of the holes may be suppressed from increasing.

Further, other effects of the power supplying device 400 in the third embodiment are similar to those of the power supplying device 100 in the first embodiment.

[Fourth Embodiment]

Next, configuration of a power supplying device 500 according to the fourth embodiment is described below with reference to FIG. 11. An electric field shielding layer 510 is provided in the power supplying device 500 in the fourth embodiment. Further, the components similar to those in the first embodiment to the third embodiment are marked with the same reference numbers and related descriptions thereof are omitted hereinafter.

(Configuration of the Power Supplying Device in the Fourth Embodiment)

Figure 11:
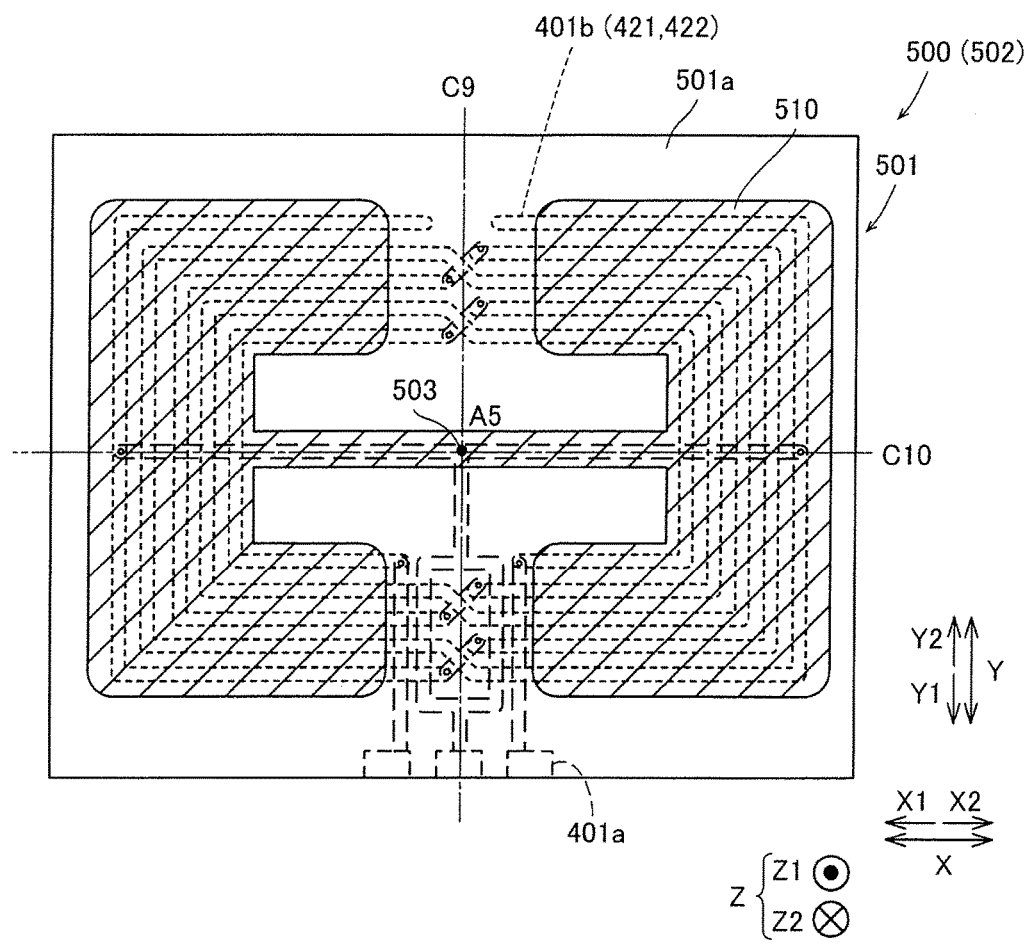
FIG. 11 is a plan view showing configuration of the wiring substrate of the power supplying device according to the fourth embodiment of the invention.

As shown in FIG. 11, the power supplying device 500 of the fourth embodiment includes a power supplying antenna 502. The power supplying antenna 502 includes the wiring substrate 501.

Here, in the fourth embodiment, the wiring substrate 501 includes the electric field shielding layer 510 (a third layer 501a). The electric field shielding layer 510 (the third layer 501a) is connected to a ground point AS and formed to show a substantial line symmetry with an axis C9 as the center line. Further, the electric field shielding layer 510 is also formed to show a substantial line symmetry using an axis C10 as the center line. That is, the electric field shielding layer 510 is formed to show a substantial point symmetry with a point where the axis C9 and the axis C10 are intersected (i.e., the ground point A5) as the center point.

Specifically, as shown in FIG. 11, the first layer 401a, the second layer 401b and the third layer 501a are provided in the wiring substrate 501. In addition, the third layer may be provided on an arrow Z2 direction side of the second layer as well as the arrow Z1 direction side of the first layer. The third layer may also be provided between the first layer and the second layer.

Further, the electric field shielding layer 510 is formed by a pattern made of conductors of the third layer 501a, and is capable of performing a static shielding for the electric fields. Further, a hole 503 is provided at the ground point A5 of the wiring substrate 501. The hole 503 connects the ground point A5 and the electric field shielding layer 510.

Further, when viewing from the arrow Z1 direction side, the electric field shielding layer 510 is provided to cover the connecting part 423 provided in the first layer 401a as well as the positive coil 421 and the negative coil 422 provided in the second layer 401b. Specifically, the electric field shielding layer 510 is formed to include two U shapes corresponding to the rectangular shapes of the positive coil 421 and the negative coil 422.

Further, the rest of configuration of the power supplying device 500 in the fourth embodiment is similar to those of the power supplying device 100 in the first embodiment.

[Effects of the Fourth Embodiment]

The following effects may be obtained according to the fourth embodiment.

In the fourth embodiment, as described above, the wiring substrate 501 includes the electric field shielding layer 510 (the third layer 501a). The electric field shielding layer 510 (the third layer 501a) is connected to the ground point A5 and formed to show the substantial line symmetry with respect to the axis C9 as the center line. As such, with the help of the electric field shielding layer 510 having the symmetry, the electric fields generated by the positive coil 421 and the negative coil 422 may be shielded to more reliably suppress the unnecessary field emission from generating.

Further, other effects of the power supplying device 500 in the fourth embodiment are similar to those of the power supplying device 100 in the first embodiment.

MODIFICATION EXAMPLES

It should be noted that, the embodiments in the disclosure are regarded as examples rather than limitations in all aspects. The scope of the invention is defined by appended claims instead of the descriptions in the embodiments, and includes any possible changes (modification examples) containing equivalent meanings in appended claims within the scope.

For example, in the first embodiment to the fourth embodiment and the fifth embodiment, the smart phone is used as the power receiving device, but the invention is not limited thereto. For instance, vehicles, such as an electric car, may also be used as the power receiving device. In this case, the power supplying device may also be a power supply station for vehicles.

Further, in the first embodiment to the fourth embodiment, the ground point is provided further inside than the innermost windings of the positive coil and the negative coil (referring to FIG. 3), but the invention is not limited thereto. For instance, the ground point may also be provided further outside than the innermost windings of the positive coil and the negative coil but further inside than the outermost windings of the positive coil and the negative coil.

Further, in the first embodiment to the fourth embodiment, the ground point is provided at the winding center of the positive coil and the winding center of the negative coil, but the invention is not limited thereto. For instance, a ground point A6 may also be provided at positions other than the positions of the winding center A1 of the positive coil 21 and the winding center A2 of the negative coil 22 in a power supplying antenna 602 according to a first modification example shown in FIG. 12.

Figure 12:
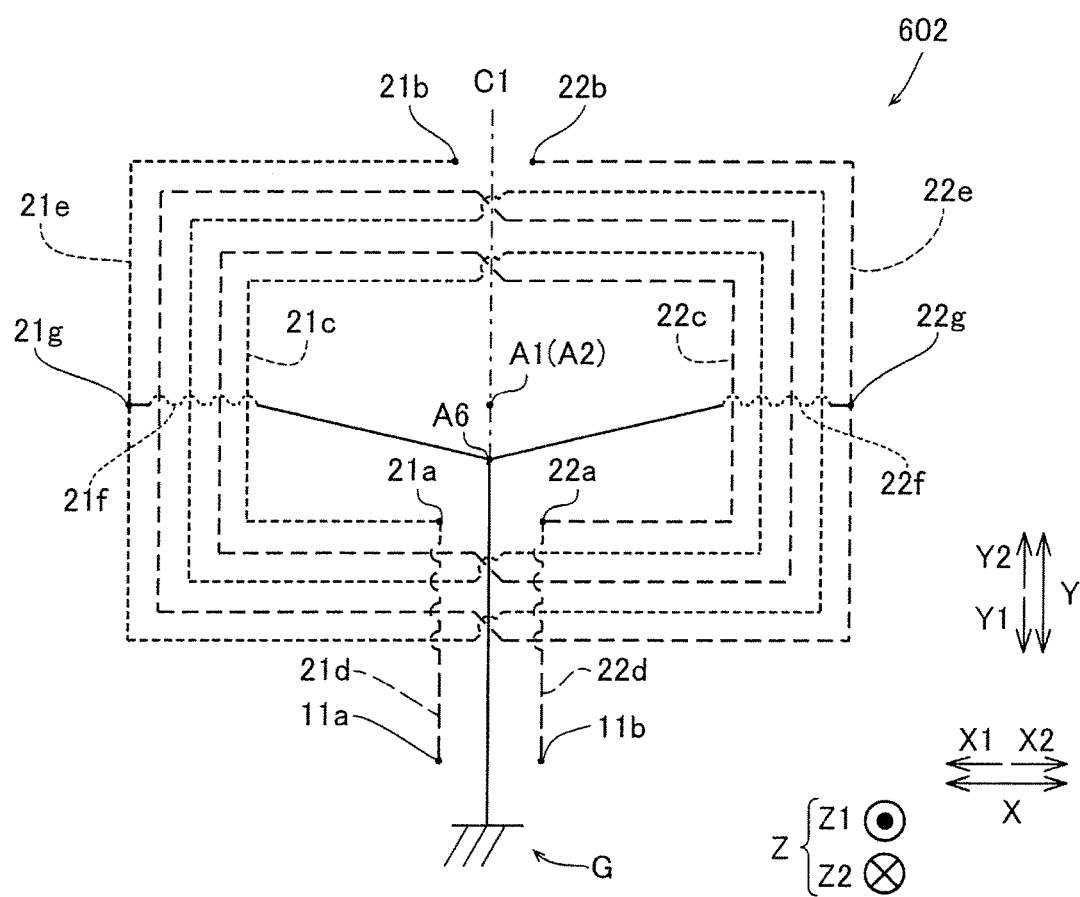
FIG. 12 is a plan view showing configuration of the power supplying antenna according to the first modification example based on the first embodiment to the fourth embodiment of the invention.

Here, in the power supplying antenna 602 of the first modification example, as shown in FIG. 12, the positive coil 21 and the negative coil 22 are provided. Also, the ground point A6 of the positive coil 21 and the negative coil 22 is provided in the innermost winding 21c of the positive coil 21 and provided closer to the arrow Y1 direction side than the winding center A1 of the positive coil 21 and the winding center A2 of the negative coil 22. In this case, the power supplying antenna 602 may also have a higher symmetry so the field emission from the positive coil 21 and the negative coil 22 may be effectively suppressed.

Further, in the fourth embodiment, the electric field shielding layer includes the two U shapes, but the invention is not limited thereto. For instance, an electric field shielding layer 710 may also include a comb tooth shape in a wiring substrate 701 according to a second modification example shown in FIG. 13.

Figure 13:
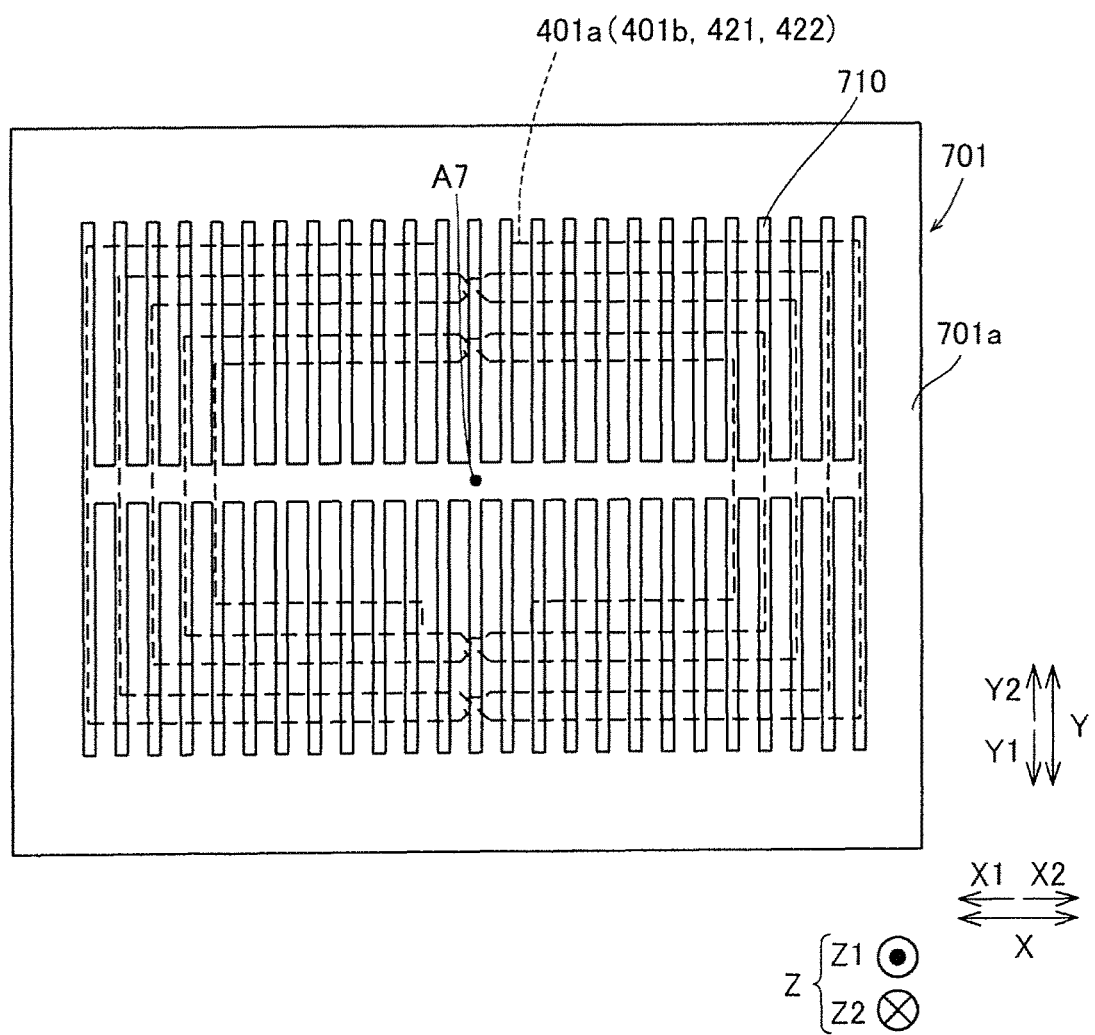
FIG. 13 is a plan view showing configuration of the wiring substrate according to the second modification example based on the fourth embodiment of the invention.

Here, in the wiring substrate 701 according to the second modification example, the first layer 401a, the second layer 401b and a third layer 701a are provided, as shown in FIG. 13. The electric field shielding layer 710 is provided in the third layer 701a. The electric field shielding layer 710 is connected to a ground point A7, and formed to show a point symmetry with respect to the ground point A7 as a center point. Also, the electric field shielding layer 710 is formed along the wiring pattern of the positive coil 421 of the first layer 401a and the negative coil 422 of the second layer 401b to include the comb tooth shape. As such, the electric field shielding layer 710 can shield the field emission from the positive coil 421 and the negative coil 422.

Further, in the first embodiment to the fourth embodiment, the positive coil and the negative coil forms the rectangular shape, but the invention is not limited thereto. For instance, the positive coil and the negative coil may also have a circular shape.

Further, in the second embodiment to the fourth embodiment, the wiring substrate includes the two layers or the three layers, but the invention is not limited thereto. For instance, the positive coil and the negative coil may also include four or more layers.

Further, in the second embodiment to the fourth embodiment, the wiring substrate is provided as the planar shape (the XY plane), but the invention is not limited thereto. For instance, a flexible substrate may be used as the wiring substrate so the wiring substrate may deform in relative to the Z direction. Accordingly, even if the flexible substrate is used as the wiring substrate, the symmetry may still be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supplying device, comprising:
    a first coil; and
    a second coil, wound to be substantially line symmetrical to the first coil with respect to a center line, wherein the center line is an axis passing through a winding center of the first coil,
    wherein a ground point of the first coil and a ground point of the second coil being provided further inside than an innermost winding of the first coil, and
    wherein a first connecting line connects the ground point of the first coil to the ground point and a second connecting line connects the ground point of the second coil to the ground point,
    wherein the first coil, the second coil and the ground point of the first coil and the ground point of the second coil are provided on a substrate having multiple layers,
    wherein the substrate comprises an electric field shielding layer, and
    the electric field shielding layer is connected to the ground point of the first coil and the ground point of the second coil are and formed to show a substantial line symmetry with respect the axis as the center line.

2. The power supplying device according to claim 1, wherein the ground point of the first coil and the ground point of the second coil are disposed near the winding center of the first coil.

3. The power supplying device according to claim 1, wherein the winding center of the first coil is identical to a winding center of the second coil.

4. The power supplying device according to claim 1, wherein the ground point of the first coil and the ground point of the second coil are provided on the winding center of the first coil and a winding center of the second coil.

5. The power supplying device according to claim 1, wherein the ground point of the first coil and the ground point of the second coil are provided on a position other than the winding center of the first coil and a winding center of the second coil.

6. The power supplying device according to claim 1, wherein the first coil has a first end and a second end, the first coil has a spiral shape with the first end disposed inside and the second end disposed outside, and a first differential signal is inputted to the first end.

7. The power supplying device according to claim 6, wherein the second coil has a third end and a fourth end, the second coil has a spiral shape with the third end disposed inside and the fourth end disposed outside, and a second differential signal having a polarity different from the first differential signal is inputted to the third end.

8. The power supplying device according to claim 7, wherein the second end of the first coil and the fourth end of the second coil are disposed near the axis at positions showing a substantial line symmetry with respect to the axis as the center line.

9. The power supplying device according to claim 7, wherein the second end and the fourth end are opened.

10. The power supplying device according to claim 7, comprising a differential power source, outputting the first differential signal and the second differential signal from the two output ends.

11. The power supplying device according to claim 1, wherein the substrate comprises a ground terminal, and the ground terminal is connected to an external ground and provided outside the first coil.

12. The power supplying device according to claim 11, wherein the substrate comprises:
    a plurality of intersected portions where the first coil and the second coil are intersected with each other when viewing from a direction perpendicular to a predetermined plane,
    wherein the first connecting line and the second connecting line are provided in at least one layer among the first layer and the second layer of the substrate and connected to the ground point of the first coil, the ground point of the second coil and the ground terminal.

13. The power supplying device according to claim 12, wherein the first and second connecting lines are formed by surrounding at least a part of the intersected portions to show a substantial line symmetry with respect to the axis as the center line.

14. The power supplying device according to claim 1, wherein the substrate comprises:
   a first terminal, connected to the first coil and one end of two output ends for outputting first and second differential signals, and provided outside the first coil; and
   a second terminal, connected to the second coil and another end of the two output ends, and provided outside the second coil.

15. The power supplying device according to claim 1, wherein the multiple layers are arranged in a manner that the first coil and the second coil are provided in a same layer serving as a coil layer, and the ground point of the first coil and the ground point of the second coil are provided in a ground layer different from the coil layer among the multiple layers.

16. The power supplying device according to claim 1, wherein each of the first coil and the second coil are provided across a first layer and a second layer among the multiple layers of the substrate.

17. The power supplying device according to claim 1, wherein the electric field shielding layer is provided by covering the first coil and the second coil.

* * * * *